April 1, 1941.  E. A. MILLER  2,236,804
PERMANENT AXIAL FASTENING MEANS FOR INTERFITTING DRIVEN ASSEMBLIES
Filed Dec. 7, 1940
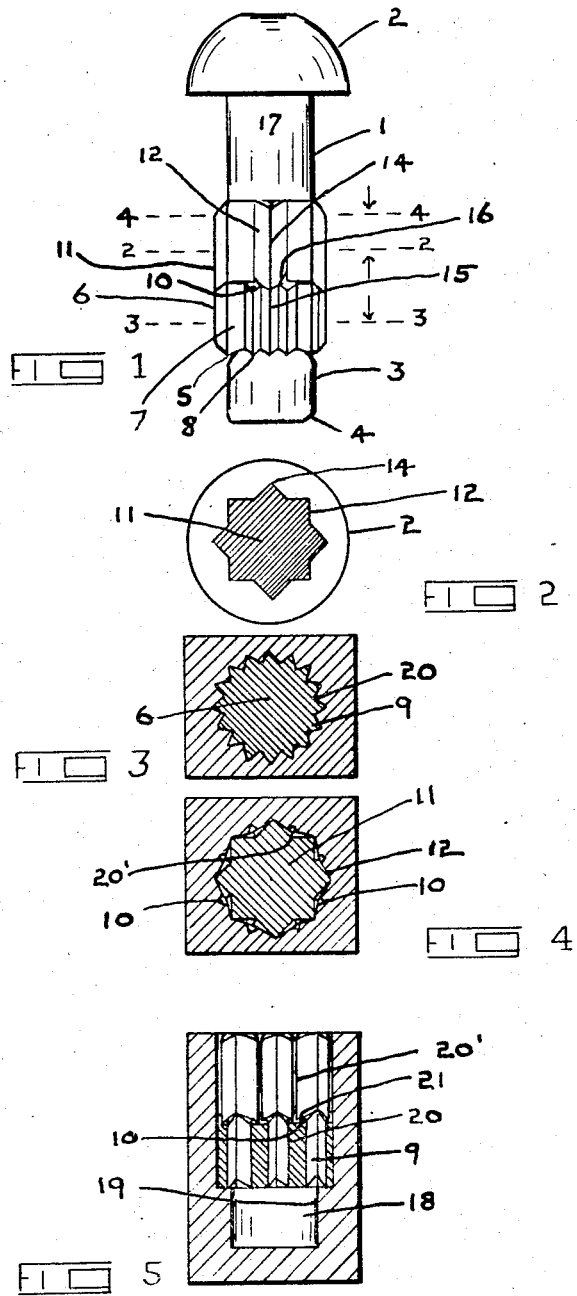
INVENTOR
EDWIN A. MILLER
by George Henry Elwell
ATTY Patented Apr. 1, 1941

2,236,804

UNITED STATES PATENT OFFICE 2,236,804

PERMANENT AXIAL FASTENING MEANS FOR INTERFITTING DRIVEN ASSEMBLIES

Edwin A. Miller, New Haven, Conn.

Application December 7, 1940, Serial No. 369,098

6 Claims. (Cl. 85—37)

This invention relates to permanent axial fastening means for the interfitting driven assembly of bodies having relatively opposing contacting wall surfaces.

The objects of the invention are to provide a positively permanent interlocking means for axially driven interfitting metal, fiber or other assemblies; to provide one of the wall surfaces of such interfitting assemblies with integral formations having cutting and forming propensities for relatively driven axial operation in sequence upon an opposingly contacting wall surface of the other interfitting member to produce in said wall surface axially extending cut channels and to reform and turn over from within certain of said channels continuous lines of ridge top of said channel walls into adjoining channels to therein block the return path of certain of the integral formations seated therein; and to provide an axially interlocked anchorage for relatively driven members of which friction is an immaterial factor.

In the accompanying drawing of Figure 1 is an upright elevation of a bolt of which the shank is provided with the improved means; Figure 2 is a cross-section of the same bolt on the line 2—2 of the previous figure; Figure 3 is a cross-section 3—3 of the Figure 1 inserted within the bore of a block, shown in cross-section; Figure 4 is a cross-section 4—4 of the Figure 1 inserted within the bore of a block shown in cross-section; and Figure 5 is the upright view of a bore within a block shown in cross-section, the wall of the bore being shown as having been operated upon by the improved means with which the bolt is provided, shouldered portions of certain formations of the bolt means being shown in cross-section locked within channels.

With more particular reference to the accompanying drawing the numeral 1 designates the shank of a bolt having the upset extremity or head 2. The pilot 3 at the free extremity of the shank 1 has a fitting diameter with respect to the bore into which it is intended to be inserted and its circular edge 4 is slightly rounded for obvious reasons. Immediately above the pilot 3, but peripherally separated therefrom by the annular groove 5, is the initial cutting series 6 of the ribs 7 of inverted V-shape in cross-section and integrally formed upon the shank 1 as exterior axially extending projections. Each inner terminal of the ribbed formation of the series 6, adjacent the pilot 3, is provided with the cutting edge 8 adapted, when sufficiently hard with respect to the work upon which it is intended to operate, to cut V-shaped channels 9 in the wall surface of a bore into which the pilot 3 of the shank 1 is driven. Each outer terminal of the ribbed formation of the series 6 is provided with an abrupt shoulder 10. Immediately above the series 6 is the follower forming series 11 of the ribs 12 of inverted V-shape in cross-section and integrally formed upon the shank 1 as axially extending projections thereon. Each of the ribs 12 of the follower series is approximately twice the width of that of the ribs 7 of the initial series 6 and the peak line 14 of each rib 12 of the follower series 11 is in direct alignment with the peak line 15 of the alternate ribs 7 of the initial series 6. In actual production of the bolt with the improved means each peak line 15 that is in alignment with a peak line 14 is preferably an unbroken uninterrupted continuance of the aligned peak line 14. The thick basic portion of each of the lower terminals 16 of the wide ribs 12 of the follower series 11 is provided with a blunt bevel to enable its entrance within the narrower aligned channels 9 of the work. While the lines defining the sides of the inverted V-shaped ribs 12 of the follower series 11 are illustrated as straight from the base to the peak line 14 it might be found best in actual production to make such side lines either convex or concave whichever it may be found advisable in the matter of directing the proper force in reforming the aligned channels 9 of a particular pitch of side walls. In actual experience the angular wall exteriors of the ribs 12, in connection with the pitch as illustrated, have demonstrated to provide the proper application of force required to reform that portion of the aligned channel 9 upon which the follower series operates. The shank 1, as illustrated, is shown as having an extended portion 17 situated between the head 2 and the follower series 11, but the portion 17 may be disposed of entirely or provided in any length desired according to the nature of the work upon which the bolt is expected to operate.

While the novel fastening means herein disclosed is associated with a drive bolt, the initial and follower series of cutting and forming propensities are just as well adapted for other types of assembling, such as couplings, for instance, where the said series may be formed upon the internal wall surface for operation upon the external wall surface over which the coupling is to be applied, thus taking the place of a threaded connection and enabling such coupling to have an angular interior wall surface for coupling up with a member having a similar exterior wall surface adapted to fit therein. Therefore in describing the operation of the novel fastening as applied to a bolt shank, as illustrated, the general function of the initial and follower series will be understood in its more broad application, regardless of the particular type of assembly and its wall surface to which such series may be an integral part and, if desired, such formations may be made to assume an angular trend in place of the axially extending alignment herein described. It is understood, as already explained in the previous art, that the series of rib formations should be hard in contrast to the work upon which they are to operate and, where such work may require it, the series of rib formation should be case hardened, or otherwise hardened, to insure the indestructibility of such cutting and forming ribs in their application to such work.

In operation, the pilot 3 is first inserted into the bore 18 of the proper size and the head 2 is subjected to hammer blows, or other pressure, sufficient to force the advanced movement of the shank 1 into the bore 18. As the cutting terminals 8 of the ribs 7 of the initial series 6 reach and contact with the metal surrounding the wall surface 19 of the bore 18 they are forced, by continued hammer blows or pressure, to cut therein the axially extending V-shaped channels 9. Then as the blunt bevelled terminals 16 of the forming ribs 12 of the follower series 11 enters each alternate cut channel 9, and continued hammer blows or pressure forces the wider forming ribs 12 along their respective channels 9, the substantial part of each of their channel walls, defined by their peak lines 20, is turned over, each wall in opposite direction, into abutting channels 9 so that, in the forming operation of any two laterally consecutive follower ribs 12, there will be constructed by each a continuous longitudinal line of a half section of a rib seated within the channel 9 therebetween, the meeting line of the two half sections being defined by the peak line 20' of the newly formed rib at the lower terminal of which there is provided, as a matter of course upon the completion of the operation, an abrupt shoulder 21 facing and opposingly against the abrupt shoulder 10 of the rib 7 of the initial series 6 thereby blocking the path of withdrawal of the shank 1 of the bolt.

The applicant is aware that the previous art discloses cutting rib formations adapted to cut channels in the wall surface of a bore for the purpose of causing the metal to flow and directing the flowed metal against the wall surface of the inserted bolt because of its expected clogging action producing a powerful friction and binding effect against the withdrawal of the bolt. The applicant is also aware that the same previous art discloses that, while trusting that such clogging friction would have its proper binding effect in anchoring a bolt within a bore, the operation by the same rib formation was expected to also cause certain portions of flowed metal to overhang and interlock with certain ends of rib formation so that an attempted withdrawal of the bolt from within the bore would be resisted by such overhanging portions as well as the binding of the clogged material. The improved fastening means herein disclosed does not rely upon friction beyond the driving fit of the bolt within the bore, nor does it rely upon any portion of flowed metal to lodge in a niche of the bolt structure. The anchorage of the member to which the improved fastening means is applied is positive and permanent and is held against withdrawal by a substantial rib set up directly in the path of a rib of the thus secured member. It is known that rib formations in series have been disclosed in the previous art, but so far as the applicant is aware such series have been confined to interrupted sections of what otherwise would be elongated ribs.

I claim:

1. A permanent axial fastening means for relatively driven interfitting bodies having opposing contacting wall surfaces, said means comprising initial and follower series of rib formations integrally provided by the wall surface of one of said bodies; an abrupt shoulder and cutting propensities provided by opposite terminals of each rib formation of said initial series; and forming propensities with which each of the follower rib formations is provided with each follower rib having a center line in substantial alignment with the center line of certain of the ribs of the said initial rib formations; whereby upon forced assembly of said bodies the cutting ribs are adapted to cut channels in the wall surface of the engaged body, and the ribs of the follower series are adapted to enter and, as they advance, to so reform certain channels so entered as to laterally turn over a wall of the entered channel into an abutting channel and directly in the path of an abrupt shoulder of the initial cutting rib lying therein and thereby permanently locked within said blocked channel against axial withdrawal.

2. A permanent axial fastening means for relatively driven interfitting bodies having opposing contacting wall surfaces, said means comprising initial and follower series of axially extending rib formations integrally provided by the wall surface of one of said bodies; an abrupt shoulder and cutting propensities provided by opposite terminals of each rib formation of said initial series; and forming propensities with which each of the follower rib formations is provided and having a center in direct alignment with the center of alternate ribs of said initial rib formations; whereby upon forced assembly of said bodies the cutting ribs are adapted to cut axially extending channels in the wall surface of the engaged body, and the ribs of the follower series are adapted to enter and to so reform alternate cut channels as to laterally shift both walls of the channel so entered into abutting channels directly in the path of the abrupt shoulders of the initial cutting ribs lying therein and thereby permanently locked within their respective channels against axial withdrawal.

3. A permanent axial fastening means for relatively driven interfitting bodies having opposing contacting wall surfaces, said means comprising initial and follower series of axially extending rib formations integrally provided by the wall surface of one of said bodies, the ribs of said initial series being of an inverted V-shape in cross-section and each of said ribs having a forwardly entering cutting terminal and a rearwardly facing abrupt shoulder, and the ribs of the follower series being approximately twice the width than that of the cutting ribs with each peak line in direct alignment with the peak line of an alternate cutting rib and provided with blunt bevelled channel-entering terminals; whereby upon forced assembly of said bodies the ribs of said initial series are adapted to cut axially extending channels in the wall surface of the engaged body, and the wider ribs of the follower series are adapted to enter and reform alternate cut channels and to shift the line of peaks of their respective walls over into adjacent channels and directly in the path of abrupt shoulders of the cutting ribs lying therein and thereby permanently locked within their respective channels against axial withdrawal.

4. A permanent axial fastening means for drive-bolts fitting within confining wall surface, said means comprising a proper pilot integral with the entering extremity of the bolt; initial and follower series of axially extending rib formations integrally provided by the wall surface of the bolt adjacent the pilot, the ribs of said initial series being approximately of an inverted V-shape in cross-section; a forwardly entering cutting terminal with which the initial ribs are provided; a rearwardly facing shoulder with which each cutting rib is provided, the ribs of the follower series being approximately twice the width of that of the ribs of the cutting series and having each peak line thereof in direct alignment with the peak line of alternate ribs of the initial series, each of said forming ribs having a blunt bevelled channel entering terminal; whereby upon forced driving of the bolt within the confining wall surface prepared therefor, the pilot is followed therein by the cutting ribs of the initial series thus adapted to cut axially extending channels in the confining wall surface, and the wider ribs of the follower series, entering alternate cut channels, are thus adapted to shift the lines of peaks of their walls laterally over into adjacent channels and directly in the path of abrupt shoulders of the cutting ribs lying therein and thereby permanently locked within their respective channels against axial withdrawal.

5. A permanent axial fastening means integral with the shank exterior of a bolt, said means comprising projecting formations of cutting and forming propensities adapted to operate in sequence upon the wall surface of a bore provided therefor in which to produce axially extending channels and to reproduce from within an outwardly portion of each alternate channel an axially extending rib formation having an inwardly facing abrupt shoulder within each other alternate channel in blocking engagement with an outwardly facing abrupt shoulder of the cutting means seated therein.

6. A permanent axial fastening means integral with the shank exterior of a bolt, said means comprising projecting formations of cutting and forming propensities adapted to operate in sequence upon the wall surface of a bore provided therefor in which to produce channels and to reproduce from within an outwardly portion of each alternate channel a rib formation having an inwardly facing abrupt shoulder within each other alternate channel in blocking engagement with an outwardly facing abrupt shoulder of the cutting means seated therein.

EDWIN A. MILLER.